United States Patent
Diwinsky et al.

(10) Patent No.: US 10,265,810 B2
(45) Date of Patent: Apr. 23, 2019

(54) SYSTEM AND METHOD FOR PERFORMING AN IN SITU REPAIR OF AN INTERNAL COMPONENT OF A GAS TURBINE ENGINE

(71) Applicant: General Electric Company, Schenectady, NY (US)

(72) Inventors: David Scott Diwinsky, West Chester, OH (US); Herbert Chidsey Roberts, Middletown, OH (US)

(73) Assignee: General Electric Company, Schenectady, NY (US)

( * ) Notice: Subject to any disclaimer, the term of this patent is extended or adjusted under 35 U.S.C. 154(b) by 734 days.

(21) Appl. No.: 14/957,660

(22) Filed: Dec. 3, 2015

(65) Prior Publication Data

US 2017/0157719 A1  Jun. 8, 2017

(51) Int. Cl.

| | |
|---|---|
| *B23P 6/00* | (2006.01) |
| *B22D 19/10* | (2006.01) |
| *B22D 25/02* | (2006.01) |
| *F01D 25/24* | (2006.01) |
| *B22F 7/06* | (2006.01) |

(Continued)

(52) U.S. Cl.
CPC .............. *B23P 6/007* (2013.01); *B22D 19/10* (2013.01); *B22D 25/02* (2013.01); *B22F 5/04* (2013.01);
(Continued)

(58) Field of Classification Search
CPC .......... B23P 6/007; B23P 6/045; F01D 25/24; F01D 5/005; B22D 25/02; B22D 19/10;
(Continued)

(56) References Cited

U.S. PATENT DOCUMENTS 3,995,157 A    11/1976  Holub et al.
4,619,845 A *  10/1986  Ayers ..................... C23C 4/123
                                                        239/13

(Continued)

FOREIGN PATENT DOCUMENTS

| EP | 2711759 A1 | 3/2014 |
|---|---|---|
| FR | 2906172 A1 | 3/2008 |
| WO | WO2013/097944 A1 | 7/2013 |

OTHER PUBLICATIONS

Extended European Search Report and Opinion issued in connection with corresponding EP Application No. 16199947.9 dated Apr. 7, 2017.

(Continued)

*Primary Examiner* — Moshe Wilensky
(74) *Attorney, Agent, or Firm* — General Electric Company; Brian Overbeck (57) ABSTRACT

In one aspect, a method for performing in situ repairs of internal components of a gas turbine engine may generally include inserting a repair tool through an access port of the gas turbine engine such that the repair tool includes a tip end positioned within the gas turbine engine and a material supply end positioned outside the gas turbine engine. The method may also include positioning the tip end of the repair tool adjacent to a defect of an internal component of the gas turbine engine, wherein the defect defines a fillable volume along a portion of the internal component. In addition, the method may include supplying a filler material to the tip end of the repair tool and expelling the filler material from the tip end of the repair tool such that the fillable volume is at least partially filled with the filler material.

11 Claims, 9 Drawing Sheets

(51) Int. Cl.
*F01D 5/00* (2006.01)
*B22F 5/04* (2006.01)
*B23P 6/04* (2006.01)
*G02B 23/24* (2006.01)
*B22F 5/00* (2006.01)

(52) U.S. Cl.
CPC .............. *B22F 7/062* (2013.01); *F01D 5/005* (2013.01); *F01D 25/24* (2013.01); *B22F 5/009* (2013.01); *B22F 2007/068* (2013.01); *B23P 6/045* (2013.01); *F05D 2220/32* (2013.01); *F05D 2230/80* (2013.01); *F05D 2260/02* (2013.01); *G02B 23/24* (2013.01)

(58) Field of Classification Search
CPC ................ B22F 7/062; B22F 2007/068; F05D 2260/02; F05D 2230/80; F05D 2220/32; G02B 23/24
See application file for complete search history.

(56) References Cited

U.S. PATENT DOCUMENTS

| | | |
|---|---|---|
| 7,387,690 B2 | 6/2008 | Kinstler |
| 7,653,996 B2 | 2/2010 | Jungbluth et al. |
| 8,563,080 B2 | 10/2013 | Hopkins |
| 2005/0235493 A1 | 10/2005 | Philip et al. |
| 2006/0042083 A1 | 3/2006 | Baker et al. |
| 2009/0250441 A1 | 10/2009 | Sullivan et al. |
| 2014/0329013 A1 | 11/2014 | Rouaud |
| 2015/0115764 A1 | 4/2015 | Nimmons et al. |
| 2015/0209915 A1 | 7/2015 | Rautenberg et al. |

OTHER PUBLICATIONS

Moridi et al., "Cold spray coating: review of material systems and future perspectives," Surface Engineering, vol. 36, No. 6, 2014.

\* cited by examiner

SYSTEM AND METHOD FOR PERFORMING AN IN SITU REPAIR OF AN INTERNAL COMPONENT OF A GAS TURBINE ENGINE

FIELD OF THE INVENTION

The present subject matter relates generally to gas turbine engines and, more particularly, to a system and method for performing an in situ repair of an internal component of a gas turbine engine.

BACKGROUND OF THE INVENTION

A gas turbine engine typically includes a turbomachinery core having a high pressure compressor, combustor, and high pressure turbine in serial flow relationship. The core is operable in a known manner to generate a primary gas flow. The high pressure compressor includes annular arrays ("rows") of stationary vanes that direct air entering the engine into downstream, rotating blades of the compressor. Collectively one row of compressor vanes and one row of compressor blades make up a "stage" of the compressor. Similarly, the high pressure turbine includes annular rows of stationary nozzle vanes that direct the gases exiting the combustor into downstream, rotating blades of the turbine. Collectively one row of nozzle vanes and one row of turbine blades make up a "stage" of the turbine. Typically, both the compressor and turbine include a plurality of successive stages.

Gas turbine engines, particularly aircraft engines, require a high degree of periodic maintenance. For example, periodic maintenance is often scheduled to allow internal components of the engine to be inspected for defects and subsequently repaired. Unfortunately, many conventional repair methods used for aircraft engines require that the engine be removed from the body of the aircraft and subsequently partially or fully disassembled. As such, these repair methods result in a significant increase in both the time and the costs associated with repairing internal engine components.

Accordingly, a system and method for performing an in situ repair of an internal component of a gas turbine engine would be welcomed within the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for performing in situ repairs of internal components of a gas turbine engine. The method may include inserting a repair tool through an access port of the gas turbine engine such that the repair tool includes a tip end positioned within the gas turbine engine and a material supply end positioned outside the gas turbine engine. The method may also include positioning the tip end of the repair tool adjacent to a defect of an internal component of the gas turbine engine, wherein the defect defines a fillable volume along a portion of the internal component. In addition, the method may include supplying liquid metal from the material supply end of the repair tool to the tip end of the repair tool and expelling the liquid metal from the tip end of the repair tool in a direction of the defect such that the fillable volume is at least partially filled with the liquid metal.

In another aspect, the present subject matter is directed to a system for performing in situ repairs of internal components of a gas turbine engine. The system may generally include an internal component installed within the gas turbine engine, wherein the internal component includes a defect defining a fillable volume. The system may also include a repair tool configured to be inserted through an access port of the gas turbine engine such that the repair tool includes a tip end positioned within the gas turbine engine at a location adjacent to the defect and a material supply end positioned outside the gas turbine engine. In addition, the system may include a liquid metal source containing liquid metal. When liquid metal from the liquid metal source is supplied to the repair tool, the liquid metal is directed from the material supply end of the repair tool to the tip end of the repair tool and expelled therefrom in a direction of the defect such that the fillable volume is at least partially filled with the liquid metal.

In a further aspect, the present subject matter is directed to a method for performing in situ repairs of internal components of a gas turbine engine. The method may include inserting a repair tool through an access port of the gas turbine engine such that the repair tool includes a tip end positioned within the gas turbine engine and a material supply end positioned outside the gas turbine engine. The method may also include positioning the tip end of the repair tool adjacent to a defect of an internal component of the gas turbine engine, wherein the defect defines a fillable volume along a portion of the internal component. In addition, the method may include supplying a solid filler material to the tip end of the repair tool and expelling the solid filler material from the tip end of the repair tool at a high flow velocity such that the solid filler material is directed onto the fillable volume and adheres to a surface of the defect as the solid filler material impacts the internal component.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for performing an in situ repair of an internal component of a gas turbine engine. Specifically, in several embodiments, the system may include a repair tool configured to be inserted through an access port of the gas turbine engine to allow a repair tip or tip end of the tool to be positioned adjacent to a defect of an internal component of the engine, such as a crack, void, distressed area or any other defect defining a fillable volume. As will be described below, the repair tool may be configured to supply a filler material from a location exterior to the engine to the internal location of the defect to allow the fillable volume defined by the defect to be filled with the filler material. For example, in one embodiment, the repair tool may be configured to supply liquid metal from the exterior of the engine into the fillable volume of the defect. The liquid metal may then cool and solidify within the volume, thereby filling-in and repairing the defect. In another embodiment, the repair tool may be configured to supply high velocity solid filler material from the exterior of the engine into the fillable volume of the defect. Upon impacting a surface of the defect, the high velocity material may plastically deform and adhere to the surface, thereby filling-in the fillable volume and repairing the defect.

It should be appreciated that the disclosed system and method may generally be used to perform in situ repairs of internal components located within any suitable type of gas turbine engine, including aircraft-based turbine engines and land-based turbine engines, regardless of the engine's current assembly state (e.g., fully or partially assembled). Additionally, with reference to aircraft engines, it should be appreciated that the present subject matter may be implemented on wing or off wing.

Figure 1:
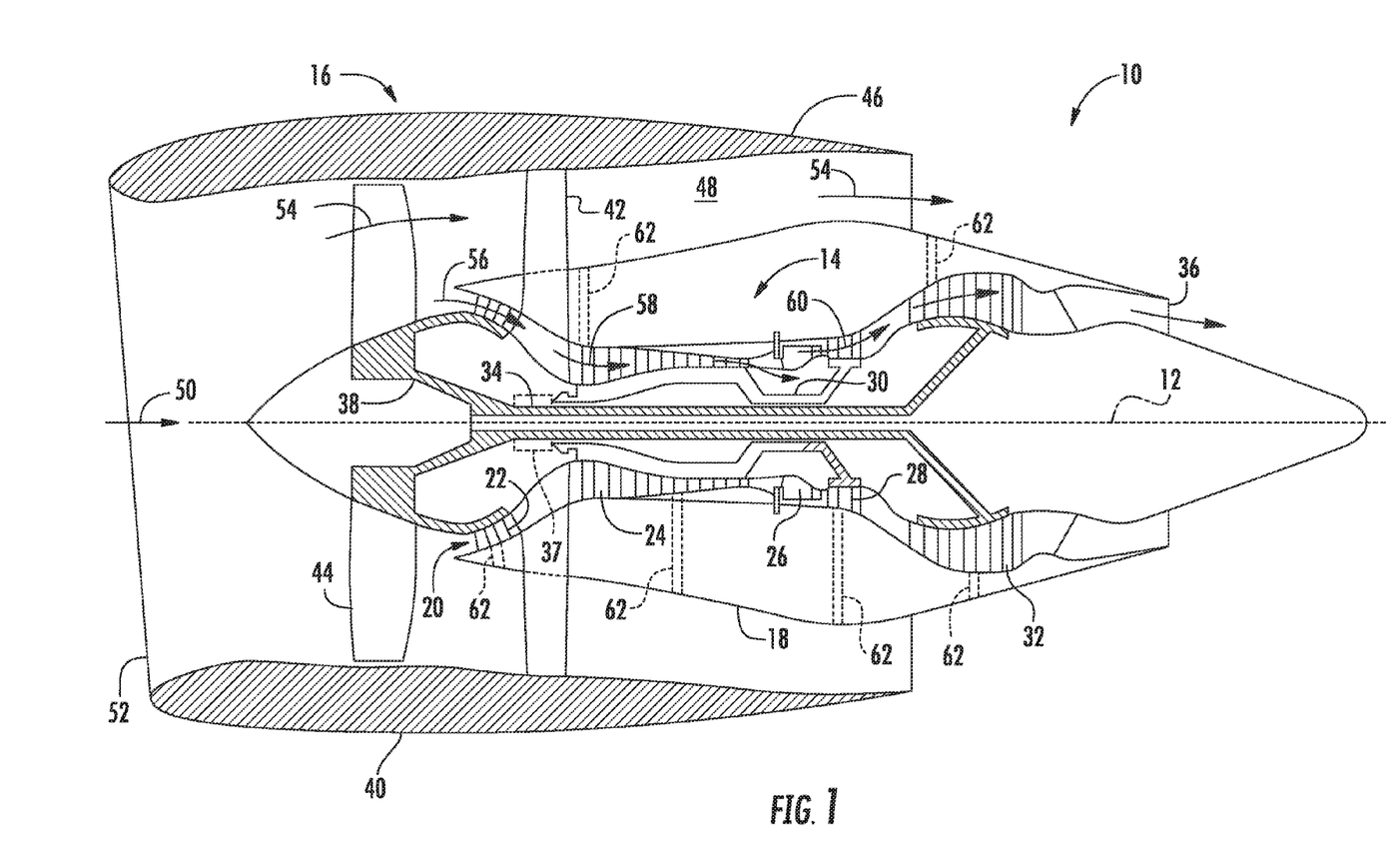
FIG. 1 illustrates a cross-sectional view of one embodiment of a gas turbine engine that may be utilized within an aircraft in accordance with aspects of the present subject matter.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

The gas turbine engine 10 may also include a plurality of access ports defined through its casings and/or frames for providing access to the interior of the core engine 14. For instance, as shown in FIG. 1, the engine 10 may include a plurality of access ports 62 (only six of which are shown) defined through the outer casing 18 for providing internal access to one or both of the compressors 22, 24 and/or for providing internal access to one or both of the turbines 28, 32. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor stage and/or each turbine stage for providing access to the internal components located at such stage(s). In addition, the access ports 62 may also be spaced apart circumferentially around the core engine 14. For instance, a plurality of access ports 62 may be spaced apart circumferentially around each compressor stage and/or turbine stage.

It should be appreciated that, although the access ports 62 are generally described herein with reference to providing internal access to one or both of the compressors 22, 24 and/or for providing internal access to one or both of the turbines 28, 32, the gas turbine engine 10 may include access ports 62 providing access to any suitable internal location of the engine 10, such as by including access ports 62 that provide access within the combustor 26 and/or any other suitable component of the engine 10.

Figure 2:
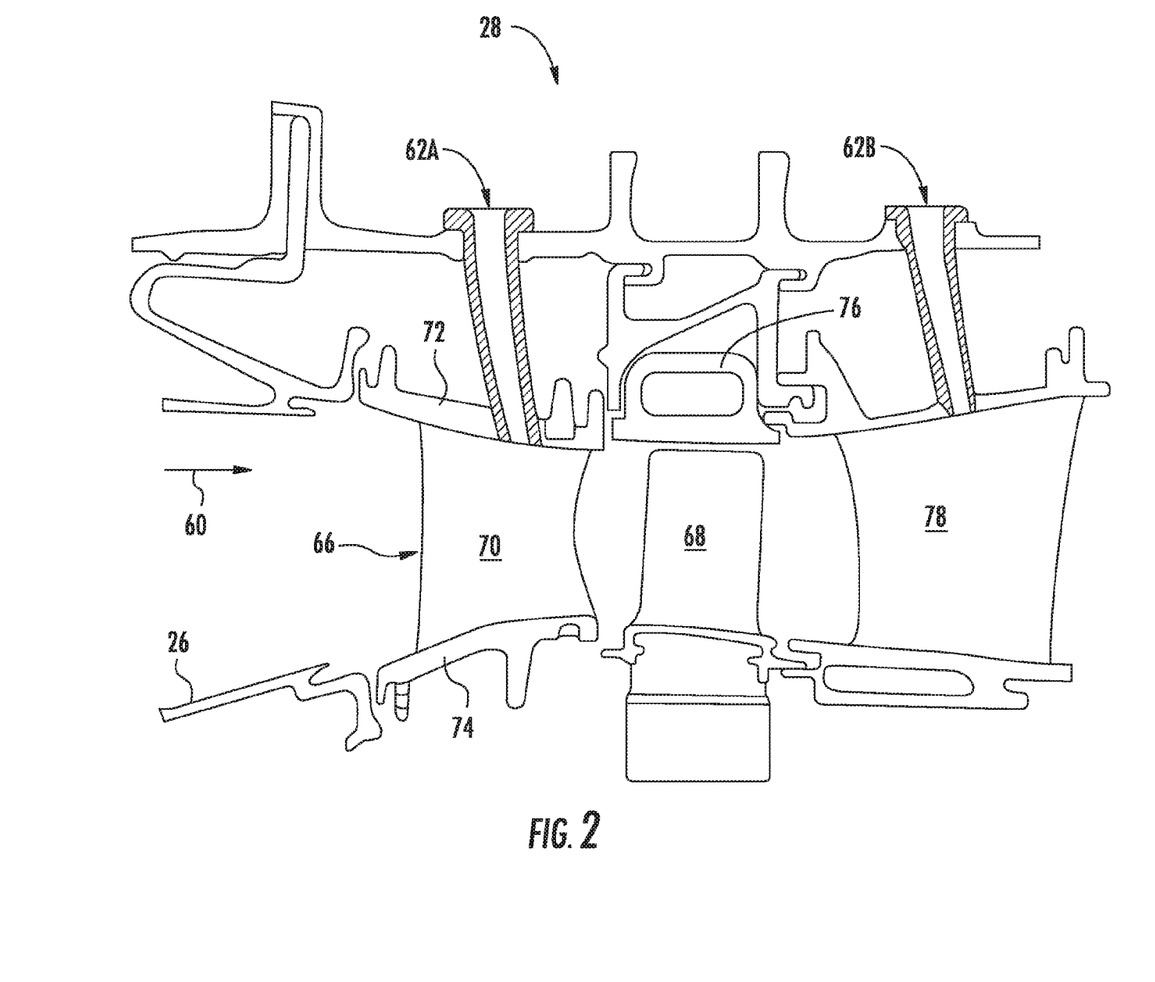
FIG. 2 illustrates a partial, cross-sectional view of one embodiment of a turbine suitable for use within the gas turbine engine shown in FIG. 1, particularly illustrating access ports defined in the engine for providing internal access to the turbine.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 66 and an annular array of rotating turbine blades 68 (one of which is shown) located immediately downstream of the nozzle 66. The nozzle 66 may generally be defined by an annular flow channel that includes a plurality of radially-extending, circularly-spaced nozzle vanes 70 (one of which is shown). The vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the engine 10. Moreover, a turbine shroud 76 may be positioned immediately adjacent to the radially outer tips of the turbine blades 68 so as to define the outer radial flowpath boundary for the combustion products 60 flowing through the turbine 28 along the hot gas path of the engine 10.

As indicated above, the turbine 28 may generally include any number of turbine stages, with each stage including an annular array of nozzle vanes and follow-up turbine blades 68. For example, as shown in FIG. 2, an annular array of nozzle vanes 78 of a second stage of the turbine 28 may be located immediately downstream of the turbine blades 68 of the first stage of the turbine 28.

Moreover, as shown in FIG. 2, a plurality of access ports 62 may be defined through the turbine casing and/or frame, with each access port 62 being configured to provide access to the interior of the turbine 28 at a different axial location. Specifically, as indicated above, the access ports 62 may, in several embodiments, be spaced apart axially such that each access port 62 is aligned with or otherwise provides interior access to a different stage of the turbine 28. For instance, as shown in FIG. 2, a first access port 62A may be defined through the turbine casing/frame to provide access to the first stage of the turbine 28 while a second access port 62B may be defined through the turbine casing/frame to provide access to the second stage of the turbine 28.

It should be appreciated that similar access ports 62 may also be provided for any other stages of the turbine 28 and/or for any turbine stages of the second (or low pressure) turbine 32. It should also be appreciated that, in addition to the axially spaced access ports 62 shown in FIG. 2, access ports 62 may be also provided at differing circumferentially spaced locations. For instance, in one embodiment, a plurality of circumferentially spaced access ports may be defined through the turbine casing/frame at each turbine stage to provide interior access to the turbine 28 at multiple circumferential locations around the turbine stage.

Figure 3:
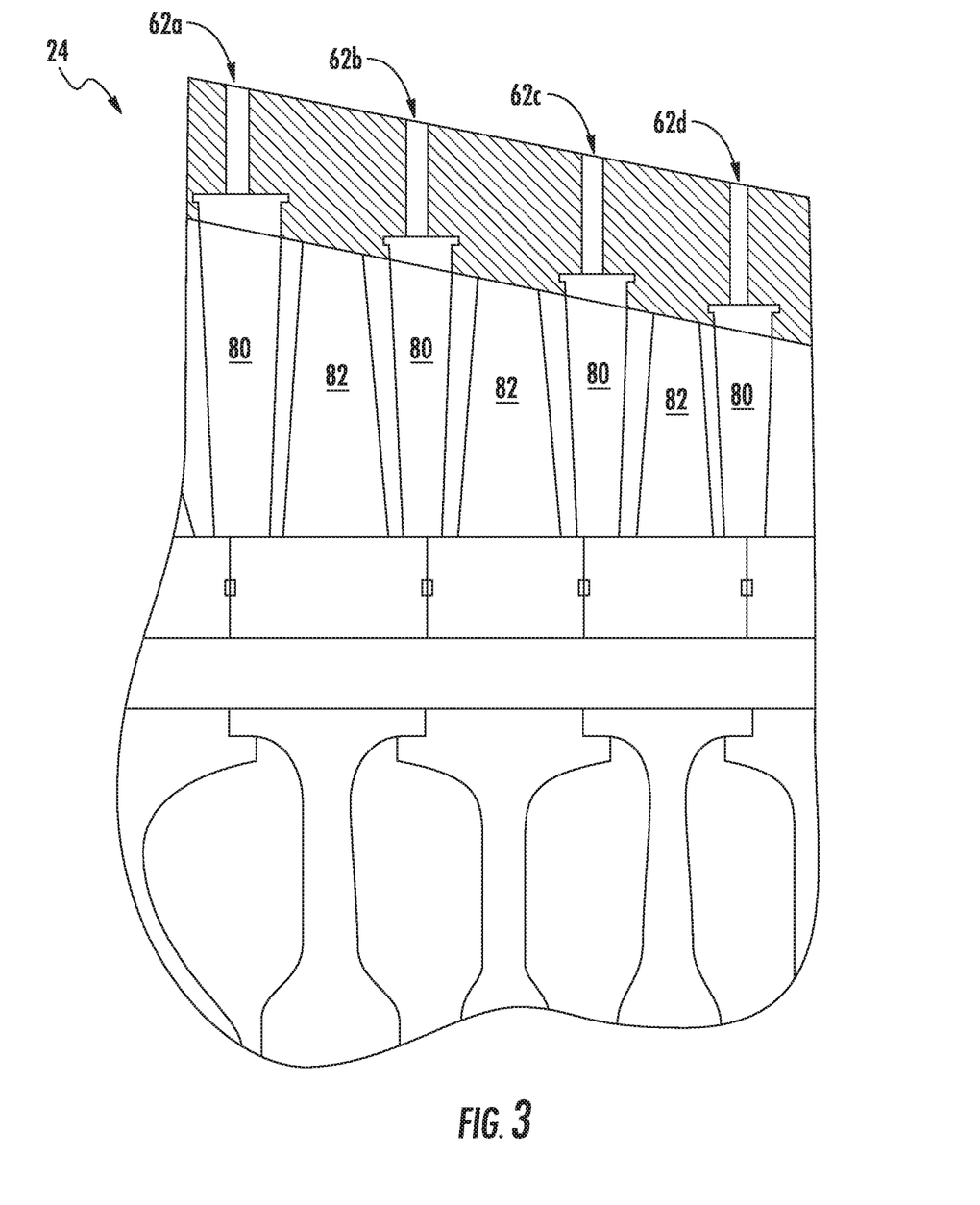
FIG. 3 illustrates a partial, cross-sectional view of one embodiment of a compressor suitable for use within the gas turbine engine shown in FIG. 1, particularly illustrating access ports defined in the engine for providing internal access to the compressor.

Referring now to FIG. 3, a partial, cross-sectional view of the high pressure compressor 24 described above with reference to FIG. 1 is illustrated in accordance with embodiments of the present subject matter. As shown, the compressor 24 may include a plurality of compressor stages, with each stage including both an annular array of fixed compressor vanes 80 (only one of which is shown for each stage) and an annular array of rotatable compressor blades 82 (only one of which is shown for each stage). Each row of compressor vanes 80 is generally configured to direct air flowing through the compressor 24 to the row of compressor blades 82 immediately downstream thereof.

Moreover, the compressor 24 may include a plurality of access ports 62 defined through the compressor casing/frame, with each access port 62 being configured to provide access to the interior of the compressor 24 at a different axial location. Specifically, in several embodiments, the access ports 62 may be spaced apart axially such that each access port 62 is aligned with or otherwise provides interior access to a different stage of the compressor 24. For instance, as shown in FIG. 3, first, second, third and fourth access ports 62a, 62b, 62c, 62d are illustrated that provide access to four successive stages, respectively, of the compressor 24.

It should be appreciated that similar access ports 62 may also be provided for any of the other stages of the compressor 24 and/or for any of the stages of the low pressure compressor 22. It should also be appreciated that, in addition to the axially spaced access ports 62 shown in FIG. 3, access ports 62 may be also provided at differing circumferentially spaced locations. For instance, in one embodiment, a plurality of circumferentially spaced access ports may be defined through the compressor casing/frame at each compressor stage to provide interior access to the compressor 24 at multiple circumferential locations around the compressor stage.

Figure 4:
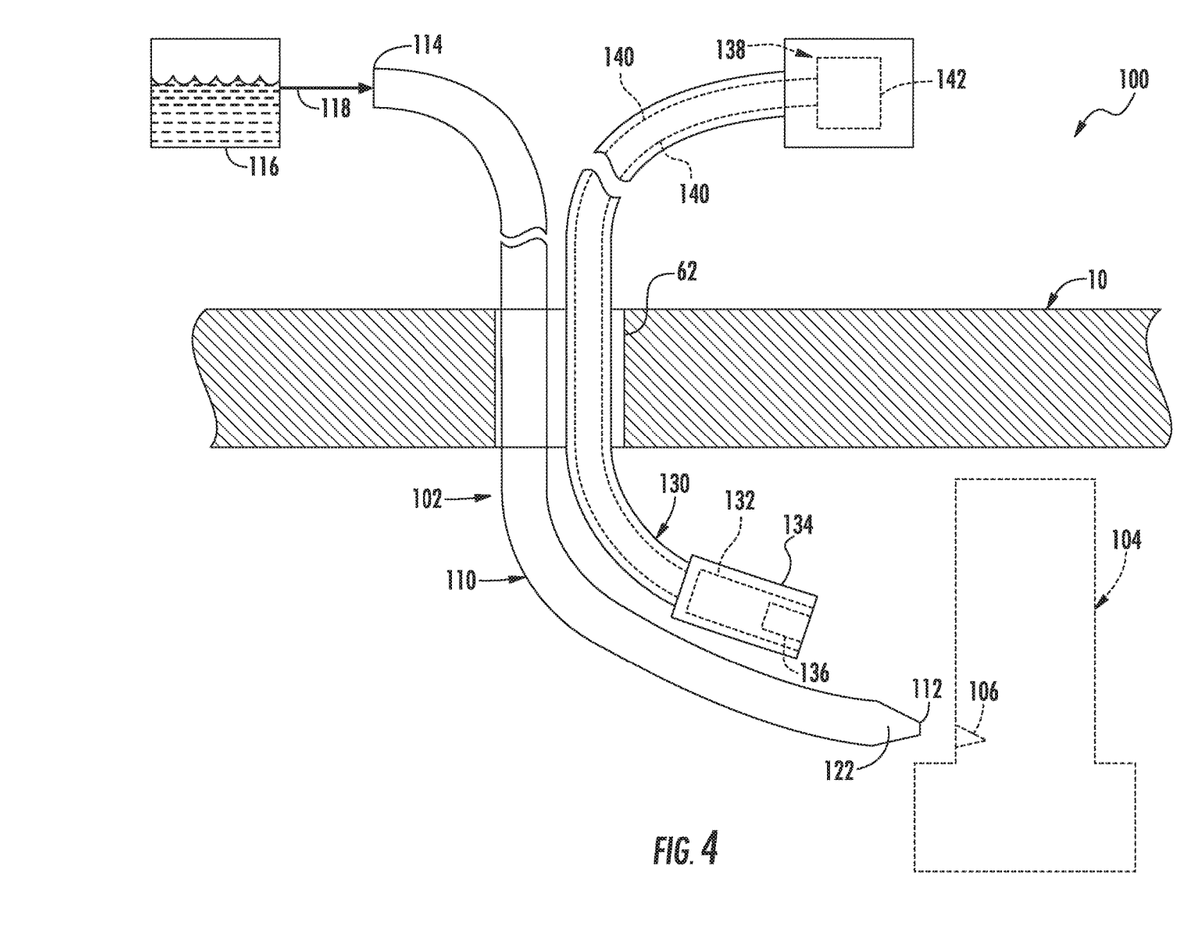
FIG. 4 illustrates a simplified view of one embodiment of a system for performing an in situ repair of an internal component of a gas turbine engine in accordance with aspects of the present subject matter, particularly illustrating a repair tool inserted through an access port of the engine for supplying liquid metal to a defect of the internal component.
Figure 5:
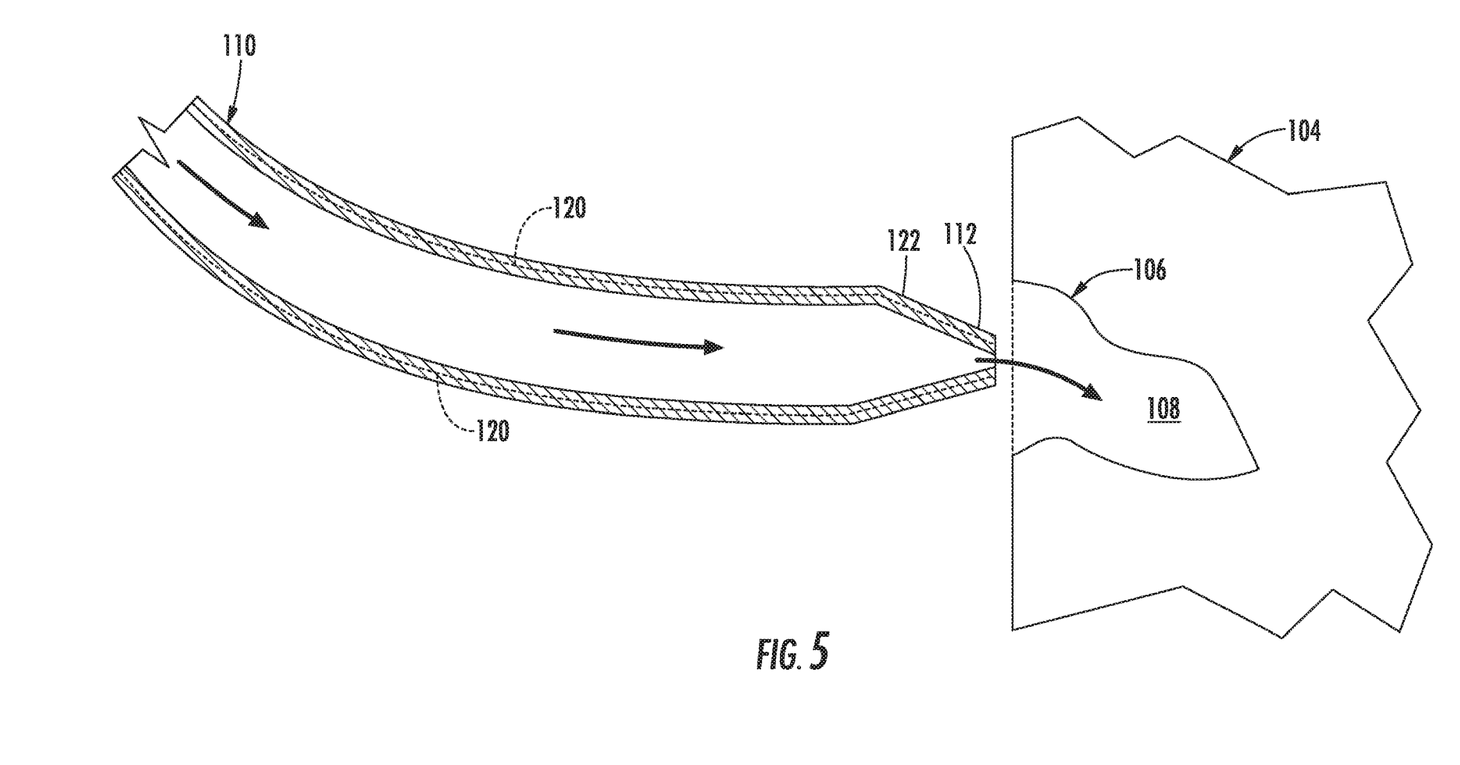
FIG. 5 illustrates a partial view of the repair tool and the internal component shown in FIG. 4, particularly illustrating a cross-sectional view of a portion of the repair tool.

Referring now to FIGS. 4 and 5, simplified views of one embodiment of a system 100 for performing an in situ repair of an internal component of a gas turbine engine 10 are illustrated in accordance with aspects of the present subject matter. As shown, the system 100 may include a repair tool 102 configured to be inserted through an access port 62 of the gas turbine engine 10, such as any of the access ports 62 described above with reference to FIGS. 1-3, to allow an in situ repair procedure to be performed on an internal component(s) (indicated by dashed lines 104) of the engine 10.

In general, the repair tool 102 may correspond to any suitable tool(s) and/or component(s) that may be inserted through an access port 62 of the gas turbine engine 10 to allow a filler material to be supplied within the engine 10 for repairing an identified defect 106 of the internal engine component(s) 104 being repaired (e.g., a turbine blade(s)). For example, as particularly shown in FIG. 5, the defect 106 corresponds to a crack, void or other defective area formed along the exterior of the component 104 that defines an open or fillable volume 108. As such, by supplying a filler material to the location of the defect via the repair tool 102, the fillable volume 108 may be filled-in with the filler material, thereby repairing the defect 106.

In several embodiments, the repair tool 102 may be configured to supply liquid metal within the interior of the gas turbine engine 10 as the filler material. For example, liquid metal may be transported via the repair tool 102 from a location exterior to the gas turbine engine 10 to a location within the engine 10 to allow the liquid metal to be injected or otherwise directed into the fillable volume 108 defined by the defect 106. The liquid metal may then solidify within the fillable volume 108 as the metal cools.

It should be appreciated that the liquid metal may generally correspond to any suitable metal material. For example, in one embodiment, the liquid metal may correspond to the parent metal material of the internal component 104 being repaired. In other embodiments, the liquid metal may correspond to any other metal material that is suitable for use as a repair material within a gas turbine engine 10.

As shown in the illustrated embodiment, the repair tool 102 may include a high temperature conduit 110 for transporting the liquid metal from outside the engine 10 to the location of the defect 106. Specifically, as shown in FIG. 4, the high temperature conduit 110 may extend lengthwise between a tip end 112 located within the gas turbine engine 10 and a material supply end 114 located exterior to the engine 10. The tip end 112 of the tool 102 may generally be configured to be positioned adjacent to the location of the defect 106 for directing the liquid metal into the fillable volume 108. Additionally, the material supply end 114 of the tool 102 may generally be configured to receive liquid metal from a liquid metal source. For example, as shown in FIG. 5, liquid metal contained within a furnace 116 (or other suitable liquid metal source) located exterior to the gas turbine engine 10 may be supplied to the material supply end 114 of the tool 102 (e.g., as indicated by arrow 118). The liquid metal received at the material supply end 114 may then be directed through the high temperature conduit 110 to the tip end 112 of the tool 102 to allow the liquid metal to be delivered to the location of the defect 106.

It should be appreciated that the high temperature conduit 110 may generally be formed from any suitable high temperature material that allows the conduit 110 to serve as a fluid delivery means for the liquid metal. For example, in several embodiments, the high temperature conduit 110 may be formed from a ceramic material capable of withstanding temperatures above the melting temperature of the metal being supplied to the defect 106. However, in other embodiments, the conduit 110 may be formed from any other suitable high temperature material.

Additionally, as particularly shown in FIG. 5, the repair tool 102 may include one or more heating elements (indicated by dashed lines 120) provided in operative association within the high temperature conduit 110. In general, the heating element(s) 120 may be configured to generate heat within the high temperature conduit 110 as liquid metal is being supplied through the conduit 110 so as to maintain the metal in its liquid state. For example, in one embodiment, the heating element(s) 120 may correspond to a resisting heating element(s), such as one or more resistance wires, that is integrated into or incorporated within a wall(s) of the conduit 110. However, in another embodiment, the heating element(s) 120 may correspond to any other suitable heat generating device(s) and/or component(s) that may be used to provide heating within the conduit 110 so as to maintain the temperature of the liquid metal at or above its melting temperature.

Moreover, in several embodiments, the repair tool 102 may also include a nozzle 122 positioned at or adjacent to the tip end 112 of the tool 102. In general, the nozzle 122 may be configured to provide enhanced control of the direction of the flow of the liquid metal expelled from the tool 102. For example, as shown in FIG. 5, the nozzle geometry may converge in the direction of the tip end 112 of the tool 102 to allow for precise control of the flow of the liquid metal relative to the defect 106. It should be appreciated that, in one embodiment, the nozzle 122 may be formed integrally within the high temperature conduit 110. Alternatively, the nozzle 122 may correspond to a separate component configured to be separately coupled to the conduit 110.

Additionally, the system 100 may also include an optical probe 130 configured to be used in association with the repair tool 102. For instance, as shown in FIG. 4, the optical probe 130 corresponds to a separate component configured to be used in combination with the repair tool 102 for repairing the defect 106. However, in other embodiments, the optical probe 130 may be coupled to or integrated within the repair tool 102. Additionally, as shown in FIG. 4, the optical probe 130 has been inserted through the same access port 62 as the repair tool 102. However, in other embodiments, the probe 130 may be inserted into a different access port 62 than the repair tool 102, such as an access port 62 located adjacent to the access port 62 within which the repair tool 102 has been inserted.

In general, the optical probe 130 may correspond to any suitable optical device that allows images of the interior of the engine 10 to be captured or otherwise obtained. For instance, in several embodiments, the optical probe 130 may correspond to a borescope, videoscope, fiberscope or any other similar optical device known in the art that allows for the interior of a gas turbine engine 10 to be viewed through an access port 62. In such embodiments, the optical probe 130 may include one or more optical elements (indicated schematically by dashed box 132), such as one or more optical lenses, optical fibers, image capture devices, cables, and/or the like, for obtaining views or images of the interior of the engine 10 at a tip 134 of the probe 130 and for transmitting or relaying such images from the probe tip 134 along the length of the probe 130 to the exterior of the engine 10 for viewing by the personnel performing the repair procedure on the internal component(s) 104. In addition, the probe 130 may include a light source (indicated by dashed box 136) positioned at or adjacent to the probe tip 134 to provide lighting within the interior of the engine 10

As shown in FIG. 4, the optical probe 130 may also include an articulation assembly 138 that allows the orientation of the probe tip 134 to be adjusted within the interior of the gas turbine engine 10. For example, the articulation assembly 138 may allow for the probe tip 134 to be rotated or pivoted about a single axis or multiple axes to adjust the orientation of the tip 134 relative to the remainder of the probe 130. It should be appreciated that the articulation assembly 138 may generally have any suitable configuration and/or may include any suitable components that allow for adjustment of the orientation of the probe tip 134 relative to the remainder of the probe 130. For example, in one embodiment, a plurality of articulation cables 140 may be coupled between the probe tip 134 and one or more articulation motors 142. In such an embodiment, by adjusting the tension of the cables 140 via the motor(s) 142, the probe tip 144 may be reoriented within the gas turbine engine 10.

Figure 6:
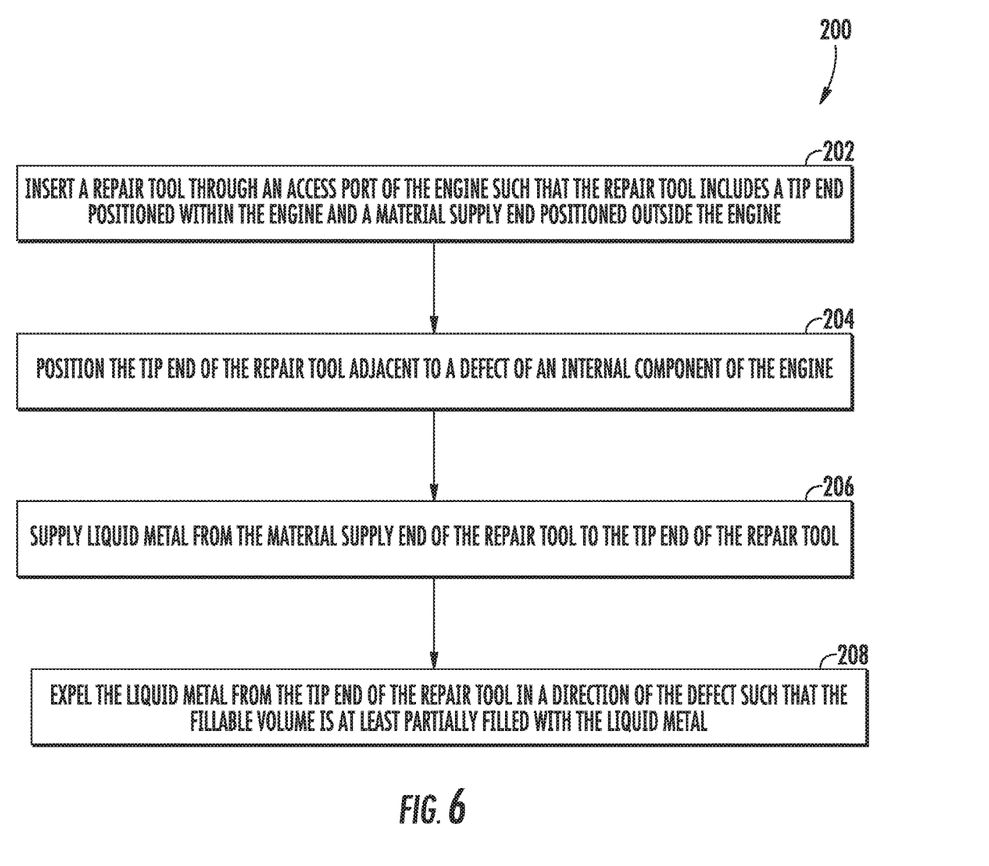
FIG. 6 illustrates a flow diagram of one embodiment of a method for performing an in situ repair of an internal component of a gas turbine engine in accordance with aspects of the present subject matter.

Referring now to FIG. 6, a flow diagram of one embodiment of a method 200 for performing an in situ repair of an internal component of a gas turbine engine is illustrated in accordance with aspects of the present subject matter. In general, the method 200 will be discussed herein with reference to the gas turbine engine 10 and the system 100 described above with reference to FIGS. 1-5. However, it should be appreciated by those of ordinary skill in the art that the disclosed method 200 may generally be implemented with gas turbine engines having any other suitable engine configuration and/or with systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include inserting a repair tool through an access port of the gas turbine engine such that the tool includes a tip end positioned within the engine and a material supply end positioned outside the engine. For example, as indicated above, the repair tool 102 may include a high temperature conduit 110 extending lengthwise between its opposed ends 112, 114. In such an embodiment, by inserting a portion of the conduit 110 through an access port 62 of the gas turbine engine 10, the tip end 112 of the repair tool 102 may be located within the interior of the engine 10 while the material supply end 114 of the tool 102 may be positioned outside the engine 10. Additionally, at (204), the method 200 may include positioning the tip end of the repair tool adjacent to a defect of an internal component of the gas turbine engine. As indicated above, the defect 106 may, for example, correspond to a crack, void or other defective area of an internal component 104 of the gas turbine engine 10.

Moreover, at (206), the method 200 may include supplying liquid metal from the material supply end of the repair tool to the tip end of the repair tool. For example, as indicated above, the system 100 may include a liquid metal source located exterior to the gas turbine engine 10, such as a furnace 116 containing liquid metal. The liquid metal may then be directed from the liquid metal source 116 through the high temperature conduit 110 to the tip end 112 of the repair tool 102.

Further, at (208), the method 200 may include expelling the liquid metal from the tip end of the repair tool in a direction of the defect such that a fillable volume of the defect is at least partially filled with the liquid metal. Specifically, as indicated above, the liquid metal directed through the high temperature conduit 110 may be expelled from the tool 102 its tip end 112 and may flow into the fillable volume 108 of the defect 106. The liquid metal may then cool and solidify, thereby filling-in the fillable volume 108 and repairing the defect 106.

Figure 7:
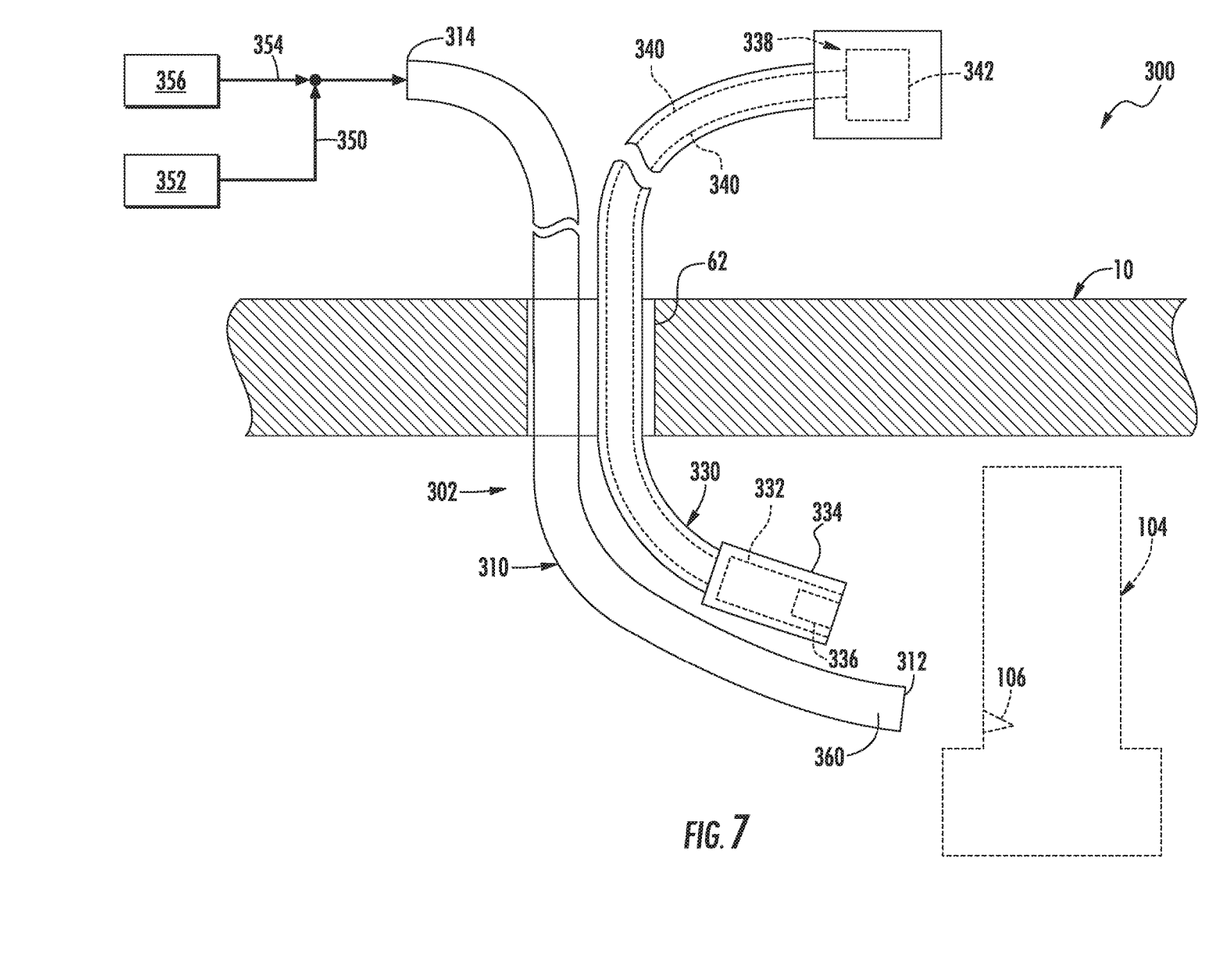
FIG. 7 illustrates a simplified view of another embodiment of a system for performing an in situ repair of an internal component of a gas turbine engine in accordance with aspects of the present subject matter, particularly illustrating a repair tool inserted through an access port of the engine for supplying a high velocity solid filler material to a defect of the internal component.
Figure 8:
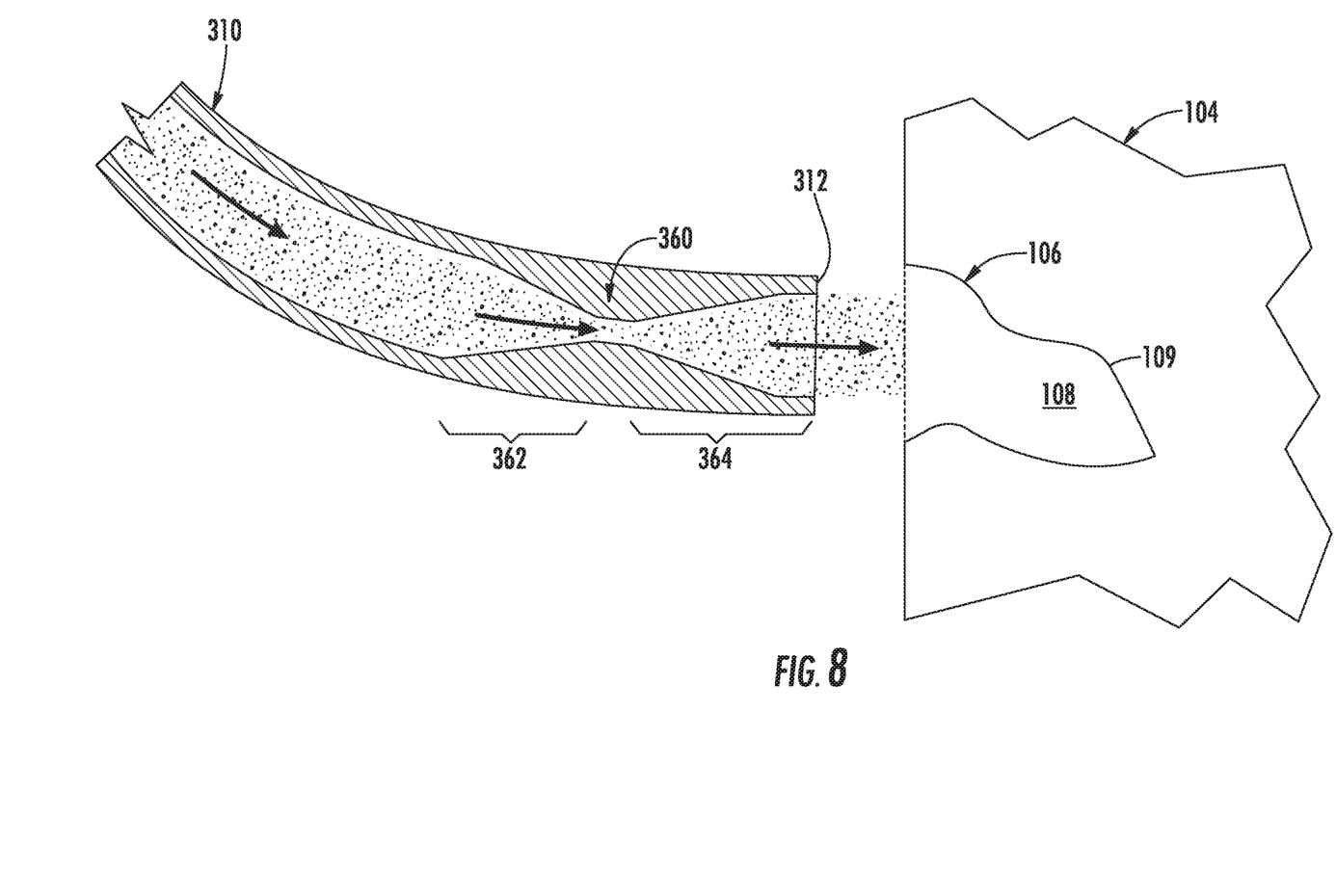
FIG. 8 illustrates a partial view of the repair tool and the internal component shown in FIG. 7, particularly illustrating a cross-sectional view of a portion of the repair tool.

Referring now to FIGS. 7 and 8, simplified views of another embodiment of a system 300 for performing an in situ repair of an internal component of a gas turbine engine 10 are illustrated in accordance with aspects of the present subject matter. As shown, the system 300 may include a repair tool 302 configured to be inserted through an access port 62 of the gas turbine engine 10, such as any of the access ports 62 described above with reference to FIGS. 1-3, to allow an in situ repair procedure to be performed on an internal component(s) (indicated by dashed lines 104) of the engine 10.

Similar to the repair tool 102 described above, the repair tool 302 may be configured to be inserted through an access port 62 of the gas turbine engine 10 to allow a filler material to be supplied within the engine 10 for filling-in a fillable volume 108 defined by an identified defect 106 formed in the internal component(s) 104 to be repaired (e.g., a turbine blade(s)). However, unlike the embodiment described above, the filler material may correspond to a solid filler material (e.g., a solid powder material or a solid granularized material) configured to be directed into the fillable volume 108 at a high velocity such that the material adheres or mechanically bonds to an inner surface 109 (FIG. 8) of the defect 106 as it impacts the internal component 104. In such an embodiment, the solid filler material may be transported via the repair tool 302 from a location exterior to the gas turbine engine 10 to a location within the engine 10 to allow the material to be expelled or sprayed into the fillable volume 108 as a high velocity powder or projectile. Due to its high kinetic energy, the filler material may undergo plastic deformation and adhere to the surface 109 of the defect 106 as the high velocity particles/projectiles impact the internal component 104.

As shown in the illustrated embodiment, the repair tool 302 may include a supply conduit 310 for transporting the solid filler material from outside the engine 10 to the location of the defect 106. Specifically, as shown in FIG. 7, the supply conduit 310 may extend lengthwise between a tip end 312 located within the gas turbine engine 10 and a material supply end 314 located exterior to the engine 10. The tip end 312 of the repair tool 302 may generally be configured to be positioned adjacent to the location of the defect 106 for directing the filler material into the fillable volume 108 of the defect 106. Additionally, the material supply end 314 of the repair tool 302 may generally be in fluid communication with both a filler material source and a high pressure gas source. For example, as shown in FIG. 7, powder material (indicated by arrow 350) provided via a powder feeder or other powder source 352 may be mixed with a pressurized gas flow (indicated by arrow 354) received from a pressurized gas source 356. The pressurized stream of powder/gas received at the material supply end 314 of the tool 302 may then be directed through the supply conduit 310 to the tip end 312 of the tool 302 for subsequent delivery to the location of the defect 106.

It should be appreciated that the solid filler material used within the system 300 may generally correspond to any suitable material that may be mechanically bonded to the inner surface 109 of the defect 106 via plastic deformation of the material upon impact with the internal component 104, such as any suitable powder material or other material typically utilized within a cold spraying process. However, in several embodiments, the solid filler material may correspond to a metal-based solid powder material or a ceramic-based solid powder material.

It should also be appreciated that the gas mixed with the filler material may generally correspond to any suitable gas. However, in several embodiments, the gas may correspond to helium, nitrogen and/or air. In addition, in one embodiment, the gas flow provided from the pressurized gas source 356 may be heated. For example, the gas flow may be directed through a gas heater (not shown) positioned upstream of the location at which the gas flow is mixed with the solid filler material.

Additionally, the repair tool 302 may also include a nozzle 360 positioned at or adjacent to the tip end 312 of the repair tool 302 for increasing the flow velocity of the stream of filler material/gas being expelled or sprayed from the tool 302 into the fillable volume 108 defined by the defect 106. As particularly shown in FIG. 8, the nozzle 360 may define a convergent-divergent geometry to allow the stream of filler material/gas to be accelerated as it flows through the nozzle 360. For example, the nozzle may be configured as a De Laval nozzle and, thus, may include an upstream convergent section 362 and a downstream divergent section 364. As such, as the stream of filler material/gas is directed from the convergent section 362 to the divergent section 364, the stream may be accelerated to a significantly high velocity. The high velocity, high energy particles/projectiles expelled from the tip end 312 of the tool 302 may then impact the inner surface 109 of the defect 106 and undergo plastic deformation, thereby allowing the particles/projectiles to mechanically bond to the inner surface 109 and at least partially fill-in the fillable volume 108.

It should be appreciated that the nozzle 360 may generally be configured to accelerate the stream of filler material/gas to any suitable velocity that allows for the particles/projectiles to mechanically bond to the inner surface 109 of the defect 106 upon impact with the internal component 104. For example, in one embodiment, the nozzle 360 may be configured to accelerate the stream of filler material/gas to a supersonic flow velocity, such as a flow velocity greater than about 330 meters per second.

Additionally, as shown in FIG. 7, the system 300 may also include an optical probe 330 configured to be used in association with the repair tool 302. In general, the optical probe 330 may be configured the same as or similar to the optical probe 130 described above with reference to FIG. 4. For example, the optical probe 330 may correspond to a borescope, videoscope or fiberscope or any other similar optical device known in the art that allows for the interior of a gas turbine engine 10 to be viewed through an access port 62. In such an embodiment, the optical probe 330 may include one or more optical elements (indicated schematically by dashed box 332), such as one or more optical lenses, optical fibers, image capture devices, cables, and/or the like for obtaining views or images of the interior of the engine 10 at a tip 334 of the probe 330 and for transmitting or relaying such images from the probe tip 334 along the length of the probe 330 to the exterior of the engine 10 for viewing by the personnel performing the repair procedure on the internal component(s) 104. In addition, the probe 330 may include a light source (indicated by dashed box 336) positioned at or adjacent to the probe tip 334 to provide lighting within the interior of the engine 10 and an articulation assembly 338 (e.g., by including one or more articulation cables 340 and an associated articulation motor(s) 342) for adjusting the orientation of the probe tip 334 within the interior of the engine 10.

Additionally, although not shown, it should be appreciated that the repair tool 302 may also include a suitable means for adjusting the orientation of its tip end 312 relative to the remainder of the tool 302. For instance, the repair tool 302 may include an articulation assembly similar to the articulation assembly 338 used for the optical probe 330 to allow the location of the tip end 312 to be accurately positioned relative to the defect 106 being repaired.

Figure 9:
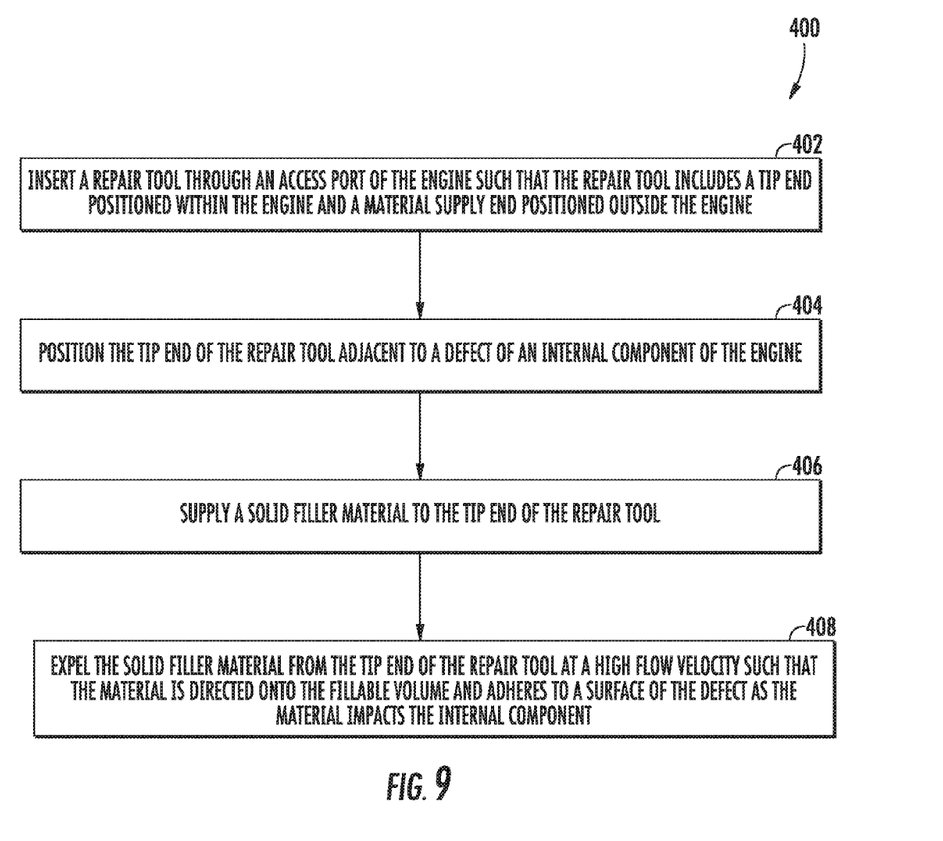
FIG. 9 illustrates a flow diagram of another embodiment of a method for performing an in situ repair of an internal component of a gas turbine engine in accordance with aspects of the present subject matter.

Referring now to FIG. 9, a flow diagram of another embodiment of a method 400 for performing an in situ repair of an internal component of a gas turbine engine is illustrated in accordance with aspects of the present subject matter. In general, the method 400 will be discussed herein with reference to the gas turbine engine 10 described above with reference to FIGS. 1-3 and the system 300 described above with reference to FIGS. 7 and 8. However, it should be appreciated by those of ordinary skill in the art that the disclosed method 400 may generally be implemented with gas turbine engines having any other suitable engine configuration and/or with systems having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (402), the method 400 may include inserting a repair tool through an access port of the gas turbine engine such that the tool includes a tip end positioned within the engine and a material supply end positioned outside the engine. For example, as indicated above, the repair tool 302 may include a high supply conduit 310 extending lengthwise between its opposed ends 312, 314. In such an embodiment, by inserting a portion of the conduit 310 through an access port 62 of the gas turbine engine 10, the tip end 312 of the repair tool 302 may be located within the interior of the engine 10 while the material supply end 314 of the tool 102 may be positioned outside the engine 10. Additionally, at (304), the method 300 may include positioning the tip end of the repair tool adjacent to a defect of an internal component of the gas turbine engine. As indicated above, the defect 106 may, for example, correspond to a crack, void or other defective area of an internal component 104 of the gas turbine engine 10.

Moreover, at (406), the method 400 may include supplying a solid filler material to the tip end of the repair tool. For example, as indicated above, the repair tool 302 may be in fluid communication with both a pressurized gas source 356 and a filler material source 354 to allow a pressurized stream of filler material/gas to be received at the material supply end 314 of the tool 302. The pressurized stream of filler material/gas may then be directed through the supply conduit 310 to the tip end 312 of the tool 302.

Further, at (408), the method 400 may include expelling the solid filler material from the tip end of the repair tool at a high flow velocity such that the material is directed onto the fillable volume and adheres to a surface of the defect as the material impacts the internal component. Specifically, as indicated above, the pressurized stream of filler material/gas may be directed through a nozzle 360 positioned at or adjacent to the tip end 312 of the tool 302 in order to accelerate the stream of filler material/gas to a substantially high flow velocity, such as a supersonic velocity. The high velocity, high energy particles/projectiles expelled from the tip end 312 of the tool 302 may then impact the inner surface 109 of the defect 106 and undergo plastic deformation, thereby allowing the particles/projectiles to mechanically bond to the inner surface 109 and at least partially fill-in the fillable volume 108 of the defect 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for performing in situ repairs of internal components of a gas turbine engine, the method comprising:
    inserting a repair tool through an access port of the gas turbine engine, the repair tool including a tip end positioned within the gas turbine engine and a material supply end positioned outside the gas turbine engine;
    positioning the tip end of the repair tool adjacent to a defect of an internal component of the gas turbine engine, the defect defining a fillable volume along a portion of the internal component;
    supplying liquid metal from the material supply end of the repair tool to the tip end of the repair tool through a high temperature conduit that is heated with a heating element, wherein the repair tool further includes a heating element provided in operative association with the high temperature conduit;
    generating heat within the high temperature conduit via the heating element as the liquid metal is being supplied through the high temperature conduit; and
    expelling the liquid metal from the tip end of the repair tool in a direction of the defect such that the fillable volume is at least partially filled with the liquid metal.

2. The method of claim 1, wherein the high temperature conduit extends lengthwise between the material supply end of the repair tool and the tip end of the repair tool, wherein supplying the liquid metal from the material supply end of the repair tool to the tip end of the repair tool comprises supplying the liquid metal through the high temperature conduit to the tip end of the repair tool.

3. The method of claim 2, wherein the high temperature conduit is formed from a ceramic material.

4. The method of claim 1, wherein the repair tool includes a nozzle positioned at or adjacent to the tip end of the repair tool, wherein expelling the liquid metal from the tip end of the repair tool comprises expelling the liquid metal from the nozzle such that the liquid metal is directed into the fillable volume defined by the defect.

5. The method of claim 1, further comprising inserting an optical probe through the access port or an adjacent access port of the gas turbine engine, the optical probe being configured to provide a view of the defect within the gas turbine engine.

6. The method of claim 5, wherein positioning the tip end of the repair tool adjacent to the defect comprises positioning the tip end relative to the defect based on the view provided by the optical probe.

7. A method for performing in situ repairs of internal components of a gas turbine engine, the method comprising:
    inserting a repair tool through an access port of the gas turbine engine, the repair tool including a tip end positioned within the gas turbine engine and a material supply end positioned outside the gas turbine engine;
    positioning the tip end of the repair tool adjacent to a defect of an internal component of the gas turbine engine, the defect defining a fillable volume along a portion of the internal component;
    supplying a solid filler material to the tip end of the repair tool; and
    expelling the solid filler material from the tip end of the repair tool at a supersonic flow velocity such that the solid filler material is directed onto the fillable volume and adheres to a surface of the defect as the solid filler material impacts the internal component, wherein supplying the solid filler material to the tip end of the repair tool comprises supplying a pressurized mixture of gas and the filler material through a nozzle positioned at or adjacent to the tip end of the repair tool, and wherein the nozzle defines a convergent-divergent nozzle geometry.

8. The method of claim 7, wherein the solid filler material corresponds to a metallic-based solid powder material or a ceramic-based solid powder material.

9. The method of claim 7, wherein the solid filler material undergoes plastic deformation and mechanically bonds to the surface of the defect as the solid filler material impacts the internal component.

10. The method of claim 7, further comprising inserting an optical probe through the access port or an adjacent access port of the gas turbine engine, the optical probe being configured to provide a view of the defect within the gas turbine engine.

11. The method of claim 10, wherein positioning the tip end of the repair tool adjacent to the defect comprises positioning the tip end relative to the defect based on the view provided by the optical probe.

* * * * *